Jan. 9, 1940.  J. PRICE  2,186,767
DOUGHNUT-MAKING MACHINE
Filed Jan. 13, 1938   2 Sheets-Sheet 1
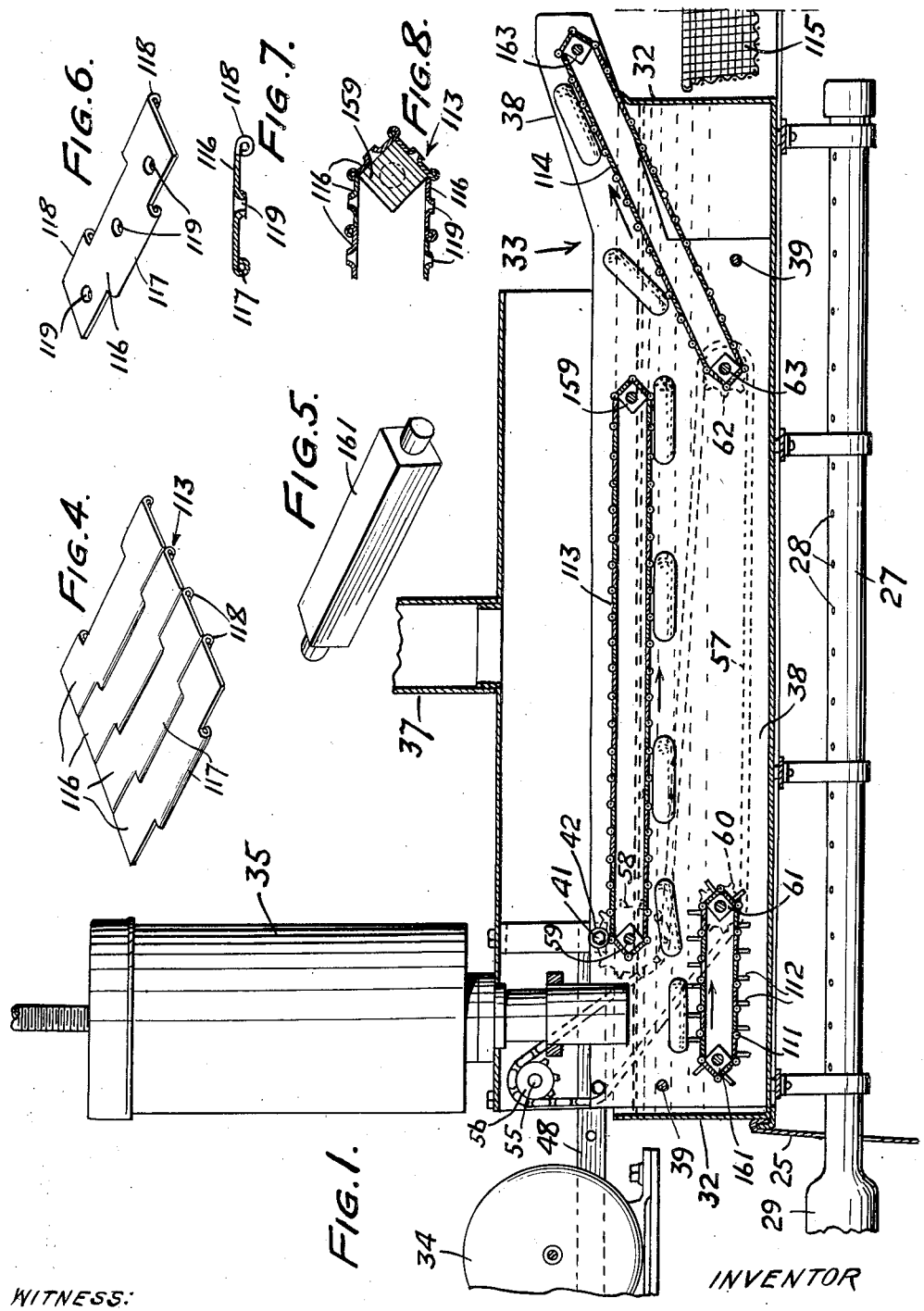
WITNESS:
Rob't R. Kitchel
INVENTOR
Jehu Price
BY
Augustus B. Stoughton
ATTORNEY.

Jan. 9, 1940.  J. PRICE  2,186,767
DOUGHNUT-MAKING MACHINE
Filed Jan. 13, 1938  2 Sheets-Sheet 2
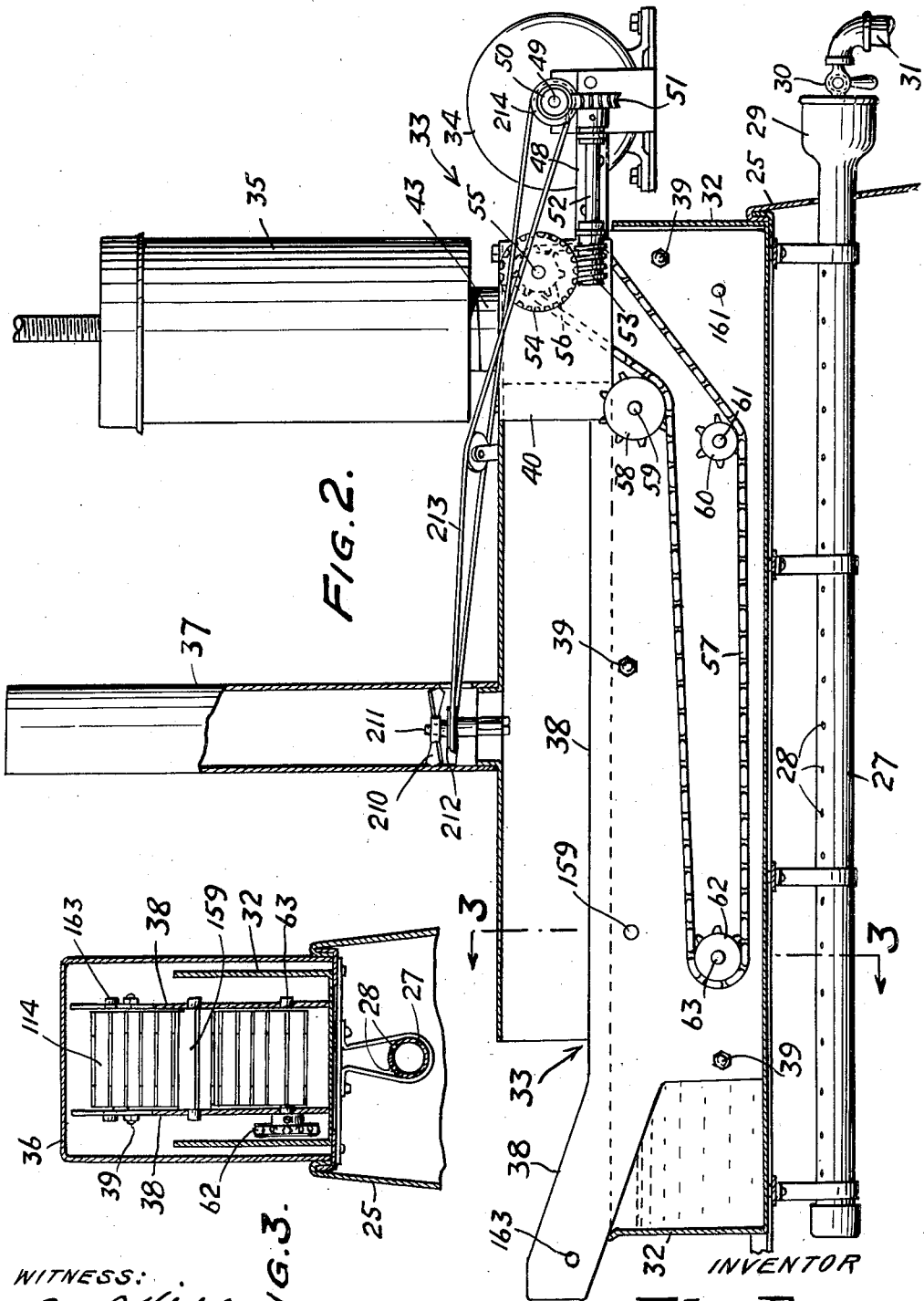
INVENTOR
Jehu Price
BY
Augustus B. Stoughton
ATTORNEY.

Patented Jan. 9, 1940

2,186,767

UNITED STATES PATENT OFFICE 2,186,767

DOUGHNUT-MAKING MACHINE

Jehu Price, Philadelphia, Pa., assignor, by mesne assignments, to Peerless Brands, Inc., Philadelphia, Pa., a corporation of Pennsylvania Application January 13, 1938, Serial No. 184,740

7 Claims. (Cl. 53—7)

The object of my invention is to provide an improved and simplified doughnut-making machine which has the following advantages among others:

(1) It is inexpensive to manufacture.

(2) It is composed of parts which are readily detachable so that they can easily be cleaned and so that the machine can be quickly inspected or repaired.

(3) It is provided with an improved means for feeding the dough and forming the doughnut.

(4) It is provided with an improved system of conveyors operating in the cooking bath one of which is located beneath the cut-off mechanism to receive the doughnut therefrom and convey it from beneath the cut-off mechanism, another of said conveyors being located above and overlying the offtake end of said first conveyor but within the cooking bath so that a doughnut floats in said bath from the upper surface of said first conveyor to the lower surface of said second conveyor, and a third conveyor located adjacent the offtake end of said second conveyor and mounted to remove the cooked doughnuts from the machine.

(5) The conveyors are of improved and simplified construction in the shape of substantially flat members pivotally connected together and having integral pivot or hinge-receiving portions and which may have perforations therein, said conveyors being adapted to co-operate with and be driven by square or other polygonally-shaped shafts.

Further features and novelties of my invention will be readily apparent from the annexed drawings and description at the end whereof those features of my invention, which I wish to specifically protect by Letters Patent, will be pointed out and claimed.

In the drawings:

Fig. 1 is a longitudinal, vertical cross-section through my device, with parts broken away.

Fig. 2 is a side elevation in the opposite direction from Fig. 1, with the grease pan and hood in vertical, longitudinal cross-section.

Fig. 3 is a cross-section on line 3—3 of Fig. 2.

Fig. 4 is a detail view showing a portion of one conveyor.

Fig. 5 is a detail view of a shaft for supporting a conveyor.

Fig. 6 is a detail view in perspective of a section of a modified type of conveyor.

Fig. 7 is a cross-section of the type shown in Fig. 6.

Fig. 8 is a vertical cross-section showing how the conveyor co-operates with the shaft.

In that embodiment of my invention chosen from among others for illustration in the drawings and description, my device is shown as consisting of a base 25 which may be supported on a pair of runners (not shown) connected thereto. Base 25 supports burner 27 having a plurality of gas outlets 28 therein and having an air-mixing valve 29, a gas-cock 30, and a gas inlet 31 connected thereto. Detachably mounted on base 25, as is conveniently seen in Figs. 1 and 3, is a pan or trough 32 for containing the grease or other cooking liquid. Pan 32 is adapted for deep fat frying and is comparatively deep and narrow in shape so that a doughnut can readily be completely immersed in the fat in the pan, the pan being only wide enough to accommodate conveyors adapted to move doughnuts in a single line or file. There is therefore no excess of grease employed in the pan which causes my machine to be much more economical in operation than those heretofore employed. Mounted so as to be supported in pan 32 is the support, generally indicated at 33, which carries the motor 34, the hopper 35, the conveyors, and the other operating mechanism. Fan 210, mounted on shaft 211 carrying pulley 212, is driven by belt 213 and pulley 214 from shaft 49 driven by motor 34. Surrounding the sides and most of the top of pan 32 and most of the support 33 is a hood 36 having a stack 37 connected thereto and leading to the atmosphere or other disposal of gases.

The operating parts of the machine consist broadly of motor 34 for supplying the power to the parts, hopper 35 for containing the dough, co-operating mechanism for expelling the dough from the hopper and cutting off adjustable, measured amounts of dough to form doughnuts, a cam for operating said cut-off mechanism, and means for controlling the operation of this cam and the parts actuated thereby. There are also conveyors, one of which receives the newly cut off dough from the cut-off mechanism and conveys it from beneath said cut-off mechanism, a second conveyor located above and overlying the offtake end of said first conveyor so as to receive a doughnut from said first conveyor and to convey said doughnut on its underside through deep fat during the cooking operation of deep fat frying, and a third conveyor for receiving doughnuts from said second conveyor and removing them from said fat and depositing them in a basket or other receptacle.

As may conveniently be seen from Figs. 1, 2 and 3, the support for the operating parts, which support is generally indicated at 33, consists in general of a pair of flat side plates 38 irregularly shaped in outline, which are attached together by a plurality of transversely extending rods 39.

Adjacent one end, plates 38 support a piece 40 which is substantially in the shape of an inverted U. Bolts 41, surrounded by sleeves 42, form the connection between plates 38 and the U-shaped member 40. U-shaped member 40 carries at its lower edge bars 48 at the outer ends of which is mounted motor 34.

Shaft 49 of motor 34 carries worm 50 which co-operates with gear 51 carried by shaft 52 carrying worm 53, which drives gear 54 fast on shaft 55. Referring for convenience to Fig. 2, it will be seen that shaft 55 carries sprocket 56 which drives chain 57, which in turn drives sprocket 58 to which is connected shaft 59. Chain 57 also drives sprocket 60 to which is connected shaft 61 and sprocket 62, to which is connected shaft 63.

As is seen in Fig. 1, between side members 38 and in horizontal alignment with shaft 61 is located a second shaft 161. About shafts 61 and 161 passes conveyor 111, which is of special construction. Fig. 4 shows conveyor-sections 116 each having at one side an integral portion 117 produced by bending up the metal from one face of the conveyor-sections, and having at its other side integral portions 118 also produced by bending up the edge of the conveyor-section. Portions 117 and 118 are adapted to overlap or interlock with similar parts of adjacent conveyor-sections, and to have pins passed through the openings in portions 117 and 118 to pivotally hinge the conveyor-sections together into a single conveyor or belt. Conveyor 111 has attached to the conveyor-sections 116 angles 112 projecting from the face of the conveyor to support a doughnut thereon away from the flat face of the conveyor. Fig. 5 shows that shafts 61 and 161 may be square or of other polygonal shape in outline and of suitable size to co-operate with the flat faces of the conveyor-sections as is best seen in Fig. 8. In alignment with shaft 59 is located another shaft 159, and about these shafts passes a conveyor 113 made up of conveyor-sections 116 having the projecting portions 117 and 118 located with their outer surfaces away from the shafts 59 and 159. Side plates 38 carry at one end thereof shaft 163 located above shaft 63 and above the top of pan 32. Around shafts 63 and 163 passes conveyor 114 of similar construction to conveyor 113. Figs. 6, 7 and 8 show a modified form of conveyor consisting of sections 116 having perforations 119 therethrough as is seen in Fig. 7. Perforations 119 serve to permit additional flow of grease to the doughnuts being conveyed by the conveyors. Conveyor 113 may, if desired, be made of this modified construction.

Referring particularly to Figs. 1 and 2, it will be seen that U-shaped member 40 carries as an insert on its upper surface a substantially ring-shaped member 43, which forms the support on which hopper 35, which may be any well-known type of doughnut-forming device, is detachably secured. The operation of my device is quite simple. Hopper 35 is filled with suitable dough and put in place. Hopper 35 is then located with its nozzle placed in annular member 43. There are thus provided in this or in other similar ways means for readily and conveniently attaching hopper 35 in place or detachably removing it. When the deep fat or other cooking liquid in pan 32 has been brought to proper cooking temperature by means of the flames from gas-burner 27, the machine is ready to commence operation. Motor 34 being in operation, shaft 55 is turned, and an annular piece of dough is cut out by the doughnut-forming mechanism 35. As seen in Fig. 1, this annular portion falls onto conveyor 111 on which it is supported on the angles 112 and is conveyed from beneath the cutter. The angles 112 compress the portions of rounded surfaces of the doughnut which rest on the thin edges of the angles 112 and cause the doughnut to slightly overlie the ends of the angles 112 so that the doughnut is positively moved by the conveyor 11 horizontally from beneath the cut-off mechanism. The hot fat or cooking liquid causes the doughnut to swell and to float up from the conveyor 111 to the underside of conveyor 113, upon which it is carried through the grease while cooking. The square or other polygonal shape of the parts of the shafts supporting conveyors 111 and 113 causes these conveyors to rise and fall slightly in the hot fat due to the fact that these positions of the shafts are not concentric with the axes of the shafts. This rise and fall moves the doughnuts through the hot fat in other directions than the horizontal, thus insuring that the surfaces of the doughnuts come in contact with the hot fat. If perforations 119 are present in the conveyors, these perforations aid in this movement of the hot fat to the surfaces of the doughnuts. At the end of conveyor 113, the doughnuts escape to the surface of the fat, where they are engaged by the upper surface of conveyor 114 which removes them from the fat and from the machine, depositing them into a basket or like suitable receptacle 115.

Because all the operating parts of the machine are located on support 33, all these parts can be bodily lifted out of pan 32 and placed in a sink or like receptacle containing a water solution of lye or similar cleaner which quickly and easily cleanses the conveyors and other operating parts without the necessity of scraping which has heretofore been necessary to clean machines of this character. Removal of support 33 and the parts carried thereby also leaves pan 32 exposed so that it can readily be cleaned without scraping.

I do not intend to be limited save as the scope of the prior art and of the attached claims may require.

I claim:

1. In a doughnut-making machine, a conveyor composed of a plurality of relatively flat conveyor-sections having integral rounded hollow parts projecting from one face of said conveyor-sections, pins passing through said parts and linking said sections together to form a conveyor, and a pair of shafts each composed of an integral piece of metal having journaled ends and having portions of polygonal shape in outline having faces of appropriate width to co-operate with the flat faces of said conveyor-sections, said conveyor being mounted on said shafts.

2. The combination according to claim 1 in which said conveyor-sections have flared openings therein, the outlines of said openings projecting in the same direction as said hollow rounded integral parts.

3. For conveying doughnuts or similar articles, a conveyor comprising, a plurality of flat sheets each having at its opposite edges integral rolled hollow portions of suitable shape in outline for inter-engagement, pins extending through said rolled portions and linking said sheets together, and shafts each composed of an integral piece of metal having journaled ends and having portions of polygonal shape in perimeter supporting said sheets, the faces of said shafts being slightly less in width than the distance between said hollow portion.

4. For conveying doughnuts or similar articles, a conveyor comprising, a pair of spaced shafts mounted for rotation and each formed of a piece of integral metal having journaled ends and having a portion of polygonal shape in outline, and a conveyor-belt mounted on said shafts and comprising, a plurality of flat sheets each being slightly greater in width than the width of one of the faces of said shafts and each having at its opposite edges hollow portions extending from that face of the sheet which is opposite to said shafts, thereby providing corrugations on the surface of said conveyor-belt, said portions also being of suitable shape in outline for interengagement, and pins extending through said hollow portions and linking said sheets together.

5. Apparatus for conveying doughnuts and the like including, a plurality of flat sheets pivotally connected to form a chain, and a pair of spaced shafts which are each formed of a solid piece of metal cylindrical in outline at its ends and polygonal in outline intermediate said ends and have faces slightly smaller in width than the width of said sheets and arranged to contact with the flat faces of said sheets so that pivotal connections for said sheets lie outside and opposite the corners of said shafts.

6. A conveyor-belt for doughnuts and the like comprising, a series of flat conveyor sections arranged substantially edge-to-edge and each having means at one edge for interlocking engagement with the adjacent edge portion of the adjoining section, said sections each having an angle thereon extending from the outer surface thereof, said angles being spaced so closely in the direction of the length of the belt as to support a doughnut thereon.

7. In a doughnut machine or the like, a conveyor comprising, a belt having an endless series of interlocked sections, a shaft for supporting one end of said belt and cut from a piece of standard metal stock to provide cylindrical ends and having a portion of polygonal shape in outline intermediate said ends, the flat faces of said shaft being adapted to successively engage the belt sections at flat faces thereof, said belt sections having interengaging portions at their advancing and rear edges extending from the opposite face of said sections from said shaft.

JEHU PRICE.